United States Patent [19]

Acher

[11] 4,060,452
[45] Nov. 29, 1977

[54] POSITIONING DRIVE FOR ABSORBER RODS OF A NUCLEAR REACTOR

[75] Inventor: Heinz Acher, Friedberg, Germany

[73] Assignee: Kraftwerk Union Aktiengesellschaft, Mulheim (Ruhr), Germany

[21] Appl. No.: 613,527

[22] Filed: Dec. 11, 1975

[51] Int. Cl.² .............................................. G21C 7/08
[52] U.S. Cl. ................................. 176/36 R; 176/86 R
[58] Field of Search .................. 176/36, 86 R, 35, 22

[56] References Cited

U.S. PATENT DOCUMENTS

| 2,780,740 | 3/1957 | Roman et al. | 176/36 R |
|---|---|---|---|
| 2,841,026 | 7/1958 | Glass | 176/36 R |
| 2,937,984 | 5/1960 | Chapellier | 176/36 R |
| 3,031,388 | 4/1962 | Barchet | 176/36 R |
| 3,050,943 | 8/1962 | Thorel et al. | 176/36 R |
| 3,088,902 | 5/1963 | Kumpf | 176/36 R |

FOREIGN PATENT DOCUMENTS 1,950,646   4/1971   Germany ................. 176/36 R Primary Examiner—Verlin R. Pendegrass
Assistant Examiner—S. A. Cangialosi
Attorney, Agent, or Firm—Kenyon & Kenyon, Reilly, Carr & Chapin

[57] ABSTRACT

The invention concerns a positioning drive for absorber rods of a nuclear reactor, of a threaded spindle and traveling nut type. In this positioning drive, rollers are provided the nut, which engage with the threads of the spindle and have an axis extending essentially at right angles to the longitudinal axis of the spindle. Three of the rollers are preferably combined in a traveling-nut housing, by means of anti-friction bearing elements. The positioning speed of such mechanical spindle drives can be increased thereby substantially. The invention is of interest particularly for boiling-water reactors.

9 Claims, 8 Drawing Figures

POSITIONING DRIVE FOR ABSORBER RODS OF A NUCLEAR REACTOR

BACKGROUND OF THE INVENTION

Nuclear reactors are used to generate steam or gas to drive turbo-generator sets in nuclear power plants, to generate electric power.

In the nuclear reactor pressure vessel is located the nuclear core, which is surrounded by a moderator, which consists as a rule of light water or garphite. This moderator is necessary in the thermal reactions, to obtain a nuclear fission process and, in the case of light-water reactors, is at the same time the reactor coolant which evaporates either in the reactor directly or generates this steam by passing the hot water coolant through the heat exchanger of steam generators.

In "fast" nuclear reactors, the so-called "breeders," the coolant consists as a rule of sodium.

To control the nuclear process, the coolant, when water, is partly pumped by forced-circulation pumps with different flow rates, particularly in the case of light-water reactors. This so-called "circulation control," however, is not sufficient in all cases and particularly not for shutting the nuclear reactor core down completely.

In principle, there are in the reactor core, absorber rods which can be run in and out of the core and which, depending on their positions, capture more or fewer of the fission neutrons required for the core's chain reaction, to intervene thereby in the nuclear process and contribute to a change of the thermal power output delivered; but these absorber rods, or control rods, are also capable of shutting down the reactor core completely.

The absorber rods are moved by so-called control rod or control assembly or absorber rod, drives, which are located either outside or inside the reactor pressure vessel. These drives, together with their associated absorber rods, have the purpose of extending the range of the coolant circulation control, to set power ranges for the circulation control and to bring about control of the burnup for the nuclear fuel.

In case of trouble, on the other hand, the nuclear reactor must be shut down quickly by the drives. For safety reasons, it is therefore necessary that a faster absorber rod moving system be coupled with the more slowly operating moving system used for the purposes mentioned above. Both systems must be operative independently of each other for safety reasons and therefore consist as a rule, of a hydraulic drive for the fast shutdown and a mechanical threaded spindle and nut drive for the slower movement of the absorber.

After a fast shutdown, it is important particularly for boiling-water reactors, in which the absorber rods are shot upwardly into the core against the force of gravity by the hydraulic drive, that the absorber rods also remain thereafter safely in the inserted position in the core. For this reason, the spindle nuts are made to follow up the hydraulic drive, which in addition to providing the possibility to bring a rod which is not quite inserted, into its fully inserted position in the core, then additionally holds the rods in their end positions, fully inserted or against unintended sliding down.

The threaded spindles of the absorber rod mechanical drives, which are driven as a rule by electric motors independent of hydraulic power, are therefore important not only from an operating but also from a safety point of view. For the further development of reactor safety, it is of particular advantage that, in addition to the fast shut-off system provided by the hydraulic drives, the mechanical spindle drives in conjunction with a recovery of the pumping power of the coolant forced-circulation pumps, constitute a second reactor shutdown system, which is sufficiently effective for certain transient processes.

One object of the invention is therefore to create a mechanical rod-positioning drive, in which the threaded spindle has a screw thread pitch as large as possible and can safely also be run, if necessary, with high speed of rotation for a core shutdown, so the absorber rod can be run into the reactor core faster than is otherwise customary for control or normal adjustment, so that in this way the mechanical drive can also take over the scram function, if necessary.

It is therefore the purpose of the present invention to improve the engagement of the spindle or traveling nut with the threads of the spindle in such a manner that relative velocities between the spindle and the traveling nut can be achieved which have not been possible heretofore. As already mentioned, it is possible with such high relative velocities, which lead to fast motion of the absorber rods through the use of a high speed of rotation or a particularly large pitch of the spindle threads, to achieve the fast motion of the absorber rods necessary for instance, for a fast shutdown of the nuclear reactor, without having to cancel the engagement between the rollers and the threads of the spindle.

In boiling-water reactors, it is further of advantage that the mechanical spindle drive, as was proposed, for instance, in the German Offenlegungsschriften Nos. 1,950,646 and 2,007,771, be located in the interior of the reactor pressure vessel, so that the bottom of the vessel can be designed with smaller drive hosuing stubs, into which smaller drive housings can then be welded which also, however, may as well be omitted.

The safety of the reactor can be further increased also if the spindle diameter and therefore, the drive housings and their stub feedthroughs, can be made smaller.

It is therefore also an object of the invention to create a spindle mechanism which is capable of meeting the safety requirements and high availability specifications even better than has been the case up to now, with the drives mounted outside as well as inside the pressure vessel. This applies particularly to control rod drives which are located inside the reactor pressure vessel and likewise have spindle drives which, however, must run there, continuously in hot reactor water (moderator) of about 300° C.

Up to now, the last-mentioned threaded spindles, which are internal to the pressure vessel, have not yet been in use under such more difficult and broader conditions. The situation is different with the spindle drives for boiling-water reactors which are already being used and are disposed in control rod drives which are situated outside the reactor pressure vessel and run in reactor water with considerably lower temperatures and relatively lower velocities.

Accordingly, spindle drives for adjusting the absorber rods are known and in use in nuclear power plants, in which the spindle nut is supported in roller elements (revolving-ball spindles) and such, in which they are guided with sliding friction and where the sliding surfaces may consist of steel and graphite.

In the case of sliding friction, particularly in aggressive reactor water, there is a pronounced danger of destruction of sliding surfaces by corrosion, especially if a potential difference between the two running partners prevails, whereby the destruction of the running surfaces by chemical corrosion is initiated.

This can be circumvented by unequal running partners, e.g., steel spindles and plastic nuts. These, however, are highly imperiled in the long run due to wear and loss of strength, particularly if used in hot water, so that graphite has so far turned out as one of the few possibilities for the nut material.

However, the graphite nut, too, loses its strength in the long run, particularly due to wear and shock stresses. Their use therefore necessitates relatively large spindle diameters and support in springs. It is not usable for axial or rod-travel velocities of more than 4 mm/sec.

The functioning of the revolving-ball spindle is jeopardized in the case of large pitch, if the absorber rod drive is located inside the reactor pressure vessel. In spite of rolling friction, where to a small extent, sliding friction is also present because of the relative motion between the balls and the ball races, this spindle type is in danger in hot reactor water due to the same, above-mentioned chemical-mechanical corrosion effect.

The formation of oxide layers at the running surfaces and the possibility that dirt from the cooling water can come in, lead in time to a blocking of the revolving balls which are so important for the proper functioning of such a drive. If one wants to counter this danger by ample radial and axial play between the nut and the spindle, then there is the danger of interference with the operation due to ball eccentricity (whip) and vibrations resulting therefrom, whereby the surfaces of the balls and therefore also the wiper tabs at the rod return tubes, can be damaged due to excessive contact pressure. Fitting the nut without play, such as tensioning two half-nuts against each other, also does not solve the problem because, although otherwise the conditions may be more favorable, the unimpeded circulation of the balls is jeopardized by additional clamping forces, particularly with a large spindle thread pitch.

It is therefore a further object of the invention to eliminate these disadvantages and to create a mechanical spindle drive which meets the above mentioned stricter safety requirements and permits, beyond this, also high operating availability. The latter is also important, as due to the safety philosophy, operating trouble in one or two absorber rod drives already may lead to a shutdown of the nuclear power plant.

The subject of the invention is now a positioning drive for absorber rods of a nuclear reactor, particularly a boiling-water reactor, with a spindle and a traveling nut which comprises anti-friction bearing means which engage the threads of the spindle.

SUMMARY OF THE INVENTION

According to the invention, the solution of the above-mentioned problems consists of the provision that the anti-friction bearing means include track rollers (called "rollers" for short in the following) and that the axes of the rollers extend essentially at right angles to the longitudinal axis of the spindle and are combined at least in threes in a traveling-nut housing by means of anti-friction bearing elements. Thereby, the spindle exerts on the rollers only minor forces which try to disengage the former from the screw threads. These forces can further be equalized among themselves by combining the at least three rollers in a supporting traveling-nut housing, so that no outward forces are generated which lead to a tilting or jamming of the rollers. Through the use of anti-friction bearing elements, care is taken at the same time for low wear, so that the positioning drives according to the invention, are suited for the long operating life required in nuclear reactors, without additional maintenance.

With the conventional threaded spindles, the rollers in such a traveling-nut housing can advantageously engage the same screw thread, whereby the adjustment of the traveling-nut assembly on the spindle becomes particularly simple. However, one can also accommodate in one traveling-nut housing more than three rollers which are braced against each other elastically, particularly by groups. Thus, one can accommodate here, for instance, two groups of three traveling nuts each, in a common housing, providing between the two groups a spring which presses the rollers against different points of the spindle.

With the rollers can further be associated guide rollers, whose only purpose it is to ensure continuous engagement between the rollers and the screw threads without major forces. To this end, the guide rollers are provided with an axis of rotation which is parallel to the longitudinal axis of the spindle, or more preferably at right angles to the slope or pitch of the threads. The guide rollers can advantageously be also accommocated in the traveling-nut housing. They may advantageously be at the same height with one of the rollers and in that case can advantageously be attached on the side of the spindle opposite to the roller.

The rollers may be arranged in a cylindrical traveling-nut housing by means of ring-segment-shaped filler bodies. The shape of the ring segments advantageously depends on the number of rollers combined in one traveling nut. In the case of three rollers, it is advantageous that the ring segments cover an angle of 120° in the cylindrical traveling-nut housing.

In one preferred embodiment of the invention, the diameter of the rollers is smaller than the width of the threads. Thus, the rollers make contact with a flank of the threads at only one point, so that there is only rolling friction between the traveling nut and the spindle. This differentiates the invention advantageously from other known positioning drives for absorber rods of nuclear reactors, such as are described, for instance, in the German Auslegeschrift No. 1,075,756. In such revolving-ball nuts there is no such unequivocal rolling friction if the close tolerances necessary for reliable operation are adhered to, which require, furthermore, rather expensive fabrication.

The rollers may also have conical running surfaces. In that case, the apex of the cone in each instance is advantageously situated on the longitudinal axis of the spindle. Thereby, linear contact between the rollers and the spindle is obtained with relatively even contact pressure, without adversely affecting the desired rolling friction.

Although the invention provides considerable advantages in any case for the design of positioning drives as far as friction and reliability are concerned, it is valuable particularly if the pitch of the threads is more than 7.5° and preferably, more than 10°. As was already indicated at the outset, a pitch as large as this makes possible the large movement necessary for a fast shutdown also without decoupling the traveling nut from the spindle to permit a hydraulic fast-drive to function. One can obtain here the fast relative movements, which are not required for normal control operation, either by means of two drive motors or otherwise by two sufficiently different spindle speeds. The kind of driving energy is not decisively important here, so that the invention can be realized not only with electric motors, possibly of the pole-changing type, but also with rotary motors operated by a pressure medium, where compressed air and hydraulic fluids can be considered as the pressure medium, among others.

In the realization of the invention, the diameter of each roller shaft may advantageously be ⅛ to 1/5 of the diameter of the roller. As the roller diameter, is considered here the diameter at that point where contact between the roller and the spindle is made. Each roller may furthermore have a support surface which extends in the radial direction relative to the spindle and takes up the potentially small forces which try to disengage the roller from the spindle. A diameter 1.5 to 2.5 times smaller than that of the roller can be used for the support surface, as thereby, the friction is kept low.

As already mentioned, two independent drives may be provided for the relative motion between the spindle and the rollers. It is advisable here to connect the one via a worm gear that can be coupled direction-dependently with the spindle. Such a direction-dependent coupling can be implemented by a free-wheeling arrangement in a manner known per se with balls, which run on an inclined plane and therefore jam in one direction of motion. Another design of direction-dependent couplings operates with pawls, as is known in ratchets, for instance.

To explain the invention in further detail, several examples will be described in the following with reference to the drawing, care being taken that even with the smallest possible axial and radial play, a blocking of the rolling-body motion and therefore, of the entire helical spindle is impossible. The significance of this is seen from the fact that due to the safety philosophy, as already mentioned above, operating trouble in one or two absorber rod drives can already lead to the shutdown of the nuclear power station. How great this probability is follows from the fact that in a 1300-MWe boiling-water reactor installation are contained 205 absorber rod drives and 205 spindle mechanisms. One absorber rod drive out of order, which is arranged outside the reactor pressure vessel, would take the nuclear reactor out of service for one day for replacing the mechanical spindle drive, for instance. With absorber rod drives which are arranged inside the reactor pressure vessel, it is necessary in order to gain access to the drives, to take off the closure head of the reactor pressure vessel and to move components, such as for instance, steam driers, steam separators, the absorber rod itself and several fuel assemblies.

With the solution according to the invention, it is furthermore easily possible to make all the rollers contribute uniformly to the support.

BRIEF DESCRIPTION OF THE DRAWINGS

Examples of this invention are schematically illustrated by the accompanying drawings, in which.

DETAILED DESCRIPTION OF THE INVENTION

Figure 1:
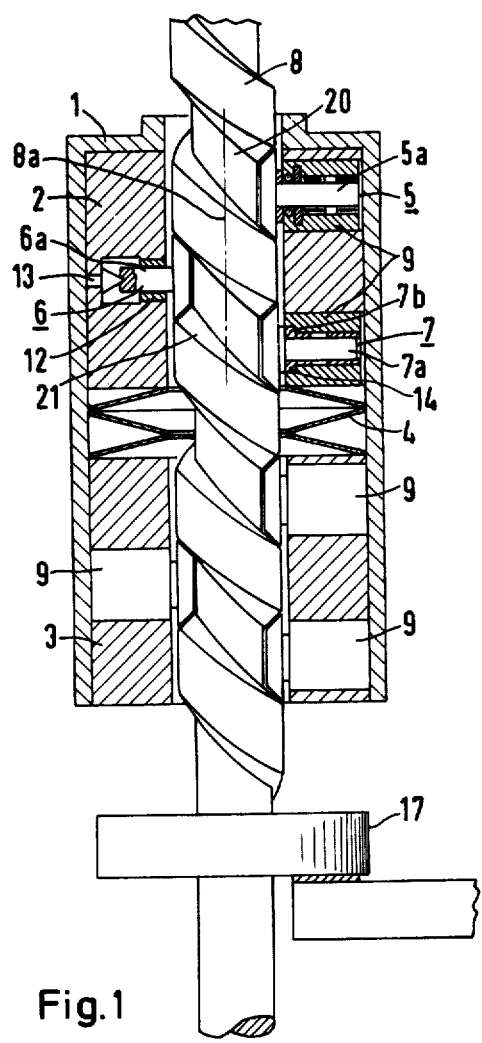
FIG. 1 is a vertical section of one example.

In FIG. 1, the example of a solution for a single-thread helical spindle 8 is shown, which is arranged in vertical position and is associated in a manner known per se with a reactor pressure vessel, not shown. The hollow piston (not shown) of the hydraulic actuator system may, for instance, be mounted here freely on the upper end face of the traveling-nut housing 1 within an absorber rod drive housing, to the upper end of which the absorber rod is then coupled. The hollow piston can be mounted here, as shown in the German Auslegeschrift No. 1,260,041, within a guide tube, secured against rotation but movable in the longitudinal direction, and the traveling-nut housing in turn can be coupled, secured against rotation, with the hollow piston, so that a separate anti-rotation device for the traveling-nut housing becomes superfluous and the latter is therefore supported, longitudinally movably, with the hollow piston. The traveling-nut housing 1, however, may also have a separate anti-rotation device, e.g., through the engagement of rollers in longitudinal slots of the guide tube (not shown). The function of a traveling nut is known well enough; it is moved by the clockwise or counterclockwise rotation of the spindle upward or downward for adjusting the absorber rod, wherefore a detailed explanation can be omitted here.

In the traveling-nut housing 1 there are two nut bodies 2 and 3, which are kept apart by an elastic thrust member 4, e.g., cup springs. The nut bodies are fixed against rotation relative to the housing 1 but can move linearly relative to each other.

In the nut bodies 2 and 3 are located three identical rollers 5, 6 and 7, which sit, not as they may appear to be in FIG. 1, but at an angle of 120° relative to each other, side by side and each below another on the running surface of a helical slot formed by the sides of a screw thread. If, depending on the application, the three rollers of a nut body are not sufficient because of the permissible contact pressure, the second or lower nut body can, for instance, take up one-half of the load to be transmitted, by an appropriate design of the elastic thrust member 4, if the pre-tension force of the member 4 corresponds to half of the load to be transmitted. With this arrangement, pitch errors in the threaded spindle 8 can also be equalized, so that all rollers have the same share of the support.

Figure 2:
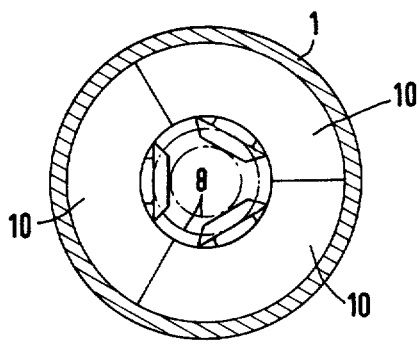
FIG. 2 is a horizontal cross-section showing a modified form of nut body.
Figure 3:
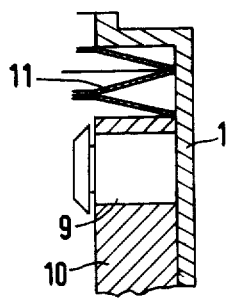
FIG. 3 is a vertical section showing a detail of the above modified form.

The three rollers 5, 6, 7 of the nut body, have conical peripheries and rest very accurately on their running surfaces or sides of the Acme screw thread 20. If the accuracy required here cannot be achieved without trouble by mechanical means, an adjustment can be made by an intermediate support of the rolles with respect to the nut housing, for instance, by an eccentric adjustably rotative bushing 9, which would then have to be applied for at least two of the roller bearings of the three rollers. However, it is also possible, if several nut housings are used, to apply this principle to all rollers in the nut housing and to then omit the spring member 4. This can be done more easily, for instance, particularly with a single-thread helical spindle than with a multi-thread helical spindle, not shown. In the case of a multi-thread helical spindle, the manufacturing tolerances for the mutual spacing of the threads must also be taken into consideration, which may make it necessary to use adjustment members such as, for instance, the eccentric bushings 9. If a spindle with, for instance, three threads is used, which is equipped with nine rollers but is not shown in the drawings, the possibility exists to design the nut bodies not as circular cylinders but as semi-cylindrical segments, as is shown, for instance, in a horizontal cross section in FIG. 2. In this case, three rollers belonging to one nut body are associated with each thread. The rollers are then connected with each other at the distance of the spindle pitch to the respective nut body either directly or via an adjusting member 9. The manufacturing tolerances between the three helical slots can now be compensated by providing between the inner end face of the traveling-nut housing 1 and the upper end face of the nut body 10 an elastic member 11, e.g., in the form of several coil springs, and by using this arrangement with all nut bodies 10, in accordance with FIG. 3.

It is, furthermore, likewise possible to use analogously for a multi-thread spindle the solution described in FIG. 1 by providing, for instance, in the case of a double-thread helix, that the rollers 5, 6 and 7 in the nut bodies 2 and 3 are each associated with one thread.

For supporting the rollers, different examples of solutions will be given. In making the selection, particularly the intended application of the spindle 8 must be noted. For instance, the support shown in FIG. 1 for the roller 5 which may be in the form of a commercially available radial and axial bearing with needles and balls (not shown in detail) is, first of all, fundamentally suited for use in atmospheric air, as is common in general machine design. For application in nuclear reactors with other ambient media, attention must be paid particularly to the ambient temperature and the purity of the medium. This type of bearing might be usable for helix spindles in absorber rod drives if the surrounding medium, such as reactor water, is very clean and perhaps only warm to the touch. This qualification may be found predominantly in absorber rod drives which are located outside of the reactor pressure vessel and through which cooling water flows, which comes as a rule from condensate supply tanks.

The examples of bearing solutions at the rollers 6 and 7 involve the application of reduced sliding friction at the roller shafts 5a. It is therefore important that the roller shafts 5a have relatively much play at the sliding surfaces, so that they are not impeded in their rotation if applied in hot reactor water of 300° C, by thermal effects or oxide and dirt formation. For this case, a solution such as is shown for the roller 6 in FIG. 1, is particularly well suited. This roller is guided with its cylindrical shaft 6a in a cylindrical bearing sleeve 12 and its end in a conical point 13 fitted in a conical recess in the shaft's end. Here, the conical point takes up not only radial forces but also lateral forces, or thrust, which can occur if conical rollers are used running on the side or flank of an Acme thread, and which must otherwise be guided against thrust at the end face of a bearing sleeve 14, as is shown in the example of the solution for the roller 7, with the bearing sleeve 14. The conical bearing point takes up the bearing forces on the short-running surfaces formed by the conical point and recess, where the circumferential velocities are low and nearly 0. The bearing sleeve 12 can form, like the bearing sleeve 14 associated with the roller 7, opposite its lower pressure area, a crescent-like empty space (not shown) which extends over an angle of about 90°, so that one has at this point a separator or run-out for oxides and dirt.

If the example of the solution is applied to the roller 7, the diameter of the roller shaft 7a can be 3.5 to 4.5 times smaller, and the outside diameter of the counter-pressure area 7b at the end face between the roller 7 and the bearing sleeve 14 2.5 to 1.5 times smaller, than the mean diameter of the roller, for the purpose that no excessive jamming force is produced by the sliding surfaces maximally present there. With a bearing play of about 0.1 mm and a shaft diameter of about 10 mm, one obtains in the foregoing way, and as a rule in an acceptable way, by which the transmission of the torque from the movement of the roller 7 on the flank 21 of the thread 20 is further amplified by its conical shape.

For the functioning of the spindle 8, the radial and axial play between the traveling nut and the spindle is also of great importance. With a vertically disposed spindle shown in FIG. 1, there is no problem with axial play because of the unilateral contact of the rollers and the thread 20 due to the moving load. The spindle thread is the shape of an Acme thread but, of course, its pitch is much longer than is standard and the angularity of its sides or flanks need not be standard, and if truncated-cone rollers according to FIG. 1, items 5, 6 and 7 are used, particularly with a cone angle of about 90°, also the force for the radial guidance is introduced into the moving load, which, however, must then be taken up by the above-mentioned lateral guides. It is of particular advantage to make the cone angle so that the geometrical apex of the cone angle coincides with the center line or axis of the spindle 8. In this manner, one always obtains a true rolling motion at all points of contact between the roller and the flank of the thread, regardless of the magnitude of the cone angle. Then, there are no relative velocities at the point of rolling contact which generate sliding friction between the running partners. However, if one wants to tolerate this friction in order to prevent lateral forces from acting on the rollers, such when cylindrical or nearly cylindrical surfaces are advisable, additional rollers 15 are then advantageous for guiding the traveling nut radially, as is shown in FIG. 4.

Figure 4:
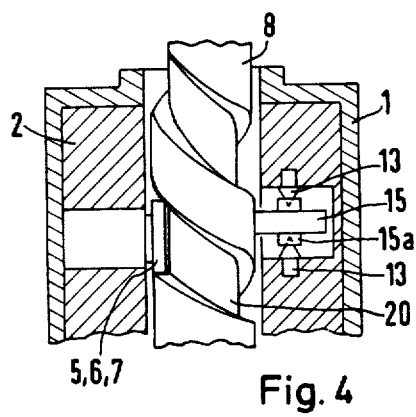
FIG. 4 is a vertical section of a part of FIG. 1, showing a modification using a support roller.

In FIG. 4, there is shown, in a nut body, on the side opposite the rollers 5, 6, 7, one lateral guidance roller 15 each which run on the screw thread crest of the spindle thread. What has already been proposed in connection with the rollers, 5 6 and 7, applies in principle also to the support of the roller 15. Complete support of the guide roller 15 can be provided by two conical points 13. If no relative motion and, therefore, sliding friction is to occur at the contact point between the roller 5, 6, 7 and the thread 20, it is necessary to arrange the roller axis 15a displaced with respect to the spindle axis 8a, by the pitch angle of the spindle thread, as will be seen in principle in the side view of FIG. 5.

The guide roller 15 can be guided relatively tightly with respect to the spindle 8. The fine adjustment of these guide rollers, however, can be performed by means of the already mentioned adjusting members.

Figure 5:
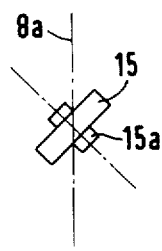
FIG. 5 shows in a side view the roller angularity of the roller of FIG. 4.
Figure 6:
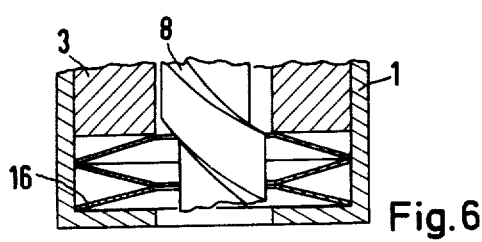
FIG. 6 is a vertical section of a modified detail.

In FIG. 6, a further example is given for the support of the two nut bodies of the design 2 or 3 with rollers which are not specifically shown. In a traveling-nut housing closed on all sides, 1, there is an elastic member 16 between one of the nut bodies and the traveling-nut housing 1, so that in this manner, the nut unit has no play whatever relative to the spindle 8, which can be important particularly for installations where the spindles are inclined or nearly horizontal. Rollers 15, FIGS. 4 and 5, are provided for radial guidance.

For the technical implementation of the spindle 8, corrosion- and water-resistant steels must be provided which, for spindles running in hot reactor water in particular, should not contain cobalt as an alloy component and also must not be stress-corrosion-prone. The selection, which is thereby narrowed down, is by the present invention made easier by the complete support for the rollers in all respects, as the exclusively sliding friction requires, at least for the spindle, a harder material than needs to be called for in case of rolling friction. Hardness and corrosion resistance are as a rule opposite parameters in such steels.

For relatively large pitch of the spindle thread and if rolling friction is used for the rollers as described hereinabove, at least one return-motion locking or preventing device is necessary, as shown in principle as item 17 in FIG. 1, in the case of vertically disposed spindles, particularly in boiling-water reactors, where the absorber rods which are upwardly driven or held in position by the spindle, must be prevented from running down by gravity out of the core in an uncontrolled manner, due to the lack of self-locking by the thread and nut elements. The return-motion locking device may be designed with known technical means. It may, for instance, consist of an arrangement in which there is attached to the spindle 8 a gear with a sawtooth-shaped tooth profile, with which several spring-loaded pawls engage and securely position or lock the nut (not shown) and therefore, the absorber rod. If the absorber rod moves into the reactor core, the pawls act as a ratchet. For a movement out of the core, the pawls must be disengaged by known technical means. A second protection, independent thereof, against unintended removal of the absorber from the core is furthermore provided by the fact that as a rule the motor drives provided for such spindle systems have brakes such as, for instance, in the case of electric motors, an armature brake, which acts automatically when the current is interrupted.

Figure 7:
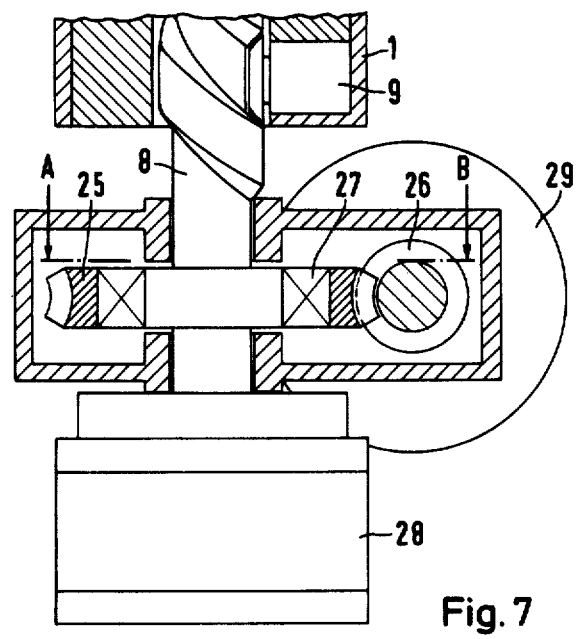
FIG. 7 is a vertical section showing a spindle-locking arrangement.
Figure 8:
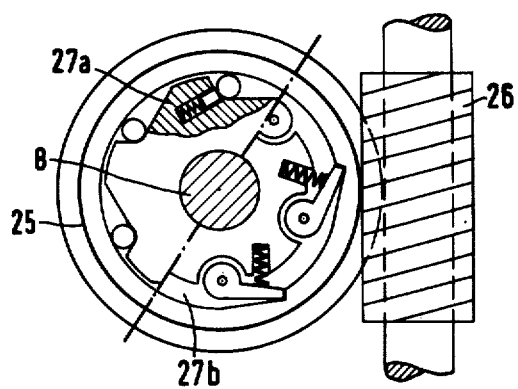
FIG. 8 is a cross section taken on the line A-B in FIG. 7.

The return-motion locking device, as shown in FIGS. 7 and 8 in a longitudinal and a cross section, may also consist of the provision that a worm gear 25 with at least one self-locking worm 26, due to short pitch, which can be set in rotation, is fastened to the spindle 8. The worm gear 25 may also be connected with the spindle 8 via a free-wheeling device or a return-motion locking device 27, shown in detail by FIG. 8, which cannot be disengaged and permits only one direction of rotation, e.g., in the case of boiling-water reactors, in the core-insertion direction. In this connection, one has the possibility to drive the absorber rod for the second or fast shut-off system, faster than is otherwise customary, by means of a second motor 28 which is arranged in the axial direction, as opposed to the motor 29 to which the worm 26 is attached and which drives the spindle 8 for control or normal adjustment. The return-motion locking device 27 may be designed, as shown in FIG. 8, in the form of a free-wheeling device 27a or as a ratchet 27b.

Without using a worm gear 25, the spindle 8 can also be driven by two different motors or also by only one, for instance, pole-changeable motor, to impart to it two different speeds.

The present invention finds application in positioning members of nuclear reactors for absorber rod drives, in which a rotary motion is converted into an axial translatory motion, the mechanism required therefor running predominantly in media other than atmospheric air. Contrary to the known spindle mechanisms, the helix spindle according to the invention makes possible a durable and operationally safe motion reversal even if the running and bearing surfaces are oxidized or dirty.

The technical advance is seen particularly in the fact that the continuous requirements for the further development of nuclear safety and availability of a nuclear reactor at one of the most sensitive points, namely, the absorber rod drives, can be met to an extent going beyond what was possible heretofore. Thus, the spindles, which are driven by motor power or manually and move the absorber rod or other elements, can be designed, instead of in the conventional manner, with a smaller diameter and larger thread pitch, so that for higher speed requirements the heretofore common speeds of such spindles need not be increased if this should not be done to other reasons, e.g., vibration, but at the same time, the bearings and the pressure-vessel feedthroughs for these spindles can further be made smaller.

A relatively small diameter of the spindle is particularly important in the absorber rod drives, because it has a decisive influence on the dimensions of the components above, up to the drive housing. In addition, the helix spindle according to the invention points a feasible way to a technical solution for control rod drives arranged in the interior of a pressure vessel. Such drives, if they have comprised spindle mechanisms called for by the system and as have been proposed already repeatedly, could not be used with conventional, known technical means, if at all.

What is claimed is:

1. A nuclear absorber and positioning drive comprising a spindle having a longitudinal axis and at least one screw thread having sides and a crest, said thread being engaged by a traveling nut having anti-friction bearing means engaging said sides; wherein the improvement comprises said bearing means comprising at least three rollers having axes at right angles to the spindle's said axis, a traveling-nut housing, and low-friction bearing members journaling said rollers to said housing so that said rollers are interspaced circumferentially around said spindle and so that said rollers are interspaced longitudinally with respect to said axis, said housing containing at least two nut bodies to which said rollers are journaled by said bearing members with at least three of the rollers to each nut body, and means for elastically thrusting said nut bodies apart, said screw thread having a width between adjacent convolutions and said rollers having a diameter, said diameter being smaller than said width.

2. The drive of claim 1 in which all of said rollers engage only said one thread.

3. The drive of claim 1 in which said housing is cylindrical and said nut body is formed by three semi-cylindrical segments.

4. The drive of claim 1 in which said screw thread has conical sides and said rollers have conical peripheral surfaces running on said sides, conic projections of said peripheral surfaces, intersecting the spindle's said longitudinal axis.

5. The drive of claim 1 in which said screw thread has a pitch of more than 7.5°.

6. The drive of claim 1 in which said rollers have a diameter and have shafts and the shafts are journaled to said housing, said shafts having a diameter of from ⅛ to 1/5 the rollers' diameter.

7. The drive of claim 1 in which said support rollers have a diameter and have thrust bearing surfaces which are from 1.5 to 2.5 times smaller than said diameter.

8. The drive of claim 1 having power means for rotating said spindle at two different speeds at least.

9. The drive of claim 8 in which said power means is for rotating said spindle reversingly in opposite directions, with releasable means for releasably locking the spindle against rotation in one of said directions.

* * * * *